April 18, 1961 D. KALISH 2,980,267
ALIGNING MACHINE
Filed Dec. 22, 1958 2 Sheets-Sheet 1

INVENTOR.
DAVID KALISH
BY Woodling and Krost,
Attys.

April 18, 1961     D. KALISH     2,980,267
ALIGNING MACHINE

Filed Dec. 22, 1958     2 Sheets-Sheet 2

*INVENTOR.*
DAVID KALISH
BY Woodling and Krost,
 Attys.

UnitedStates Patent Office 2,980,267
Patented Apr. 18, 1961

2,980,267
ALIGNING MACHINE
David Kalish, Alliance, Ohio, assignor to Consolidated Electronics Industries Corporation, a corporation of Delaware
Filed Dec. 22, 1958, Ser. No. 782,001
14 Claims. (Cl. 214—1)

The invention relates in general to machines to align a stack of objects and more particularly to machines for aligning a stack of laminations, with each lamination having a plurality of holes around the periphery.

In the manufacture of small electric motors of the alternating current type, it is customary to use laminated magnetically permeable sheets to form the magnetic core structure of both the stator and the rotor. Windings thread holes or slots in this core structure and, accordingly, in the manufacturing process of these motors the laminations must be stacked and the holes or slots aligned so that the windings may be inserted in place. In the smaller motors especially, such as the sub-fractional horsepower sizes, such motors are made by the millions and hence it is becoming increasingly important that these motors may be fabricated by automated machinery in order to increase the output and decrease the cost per unit of each motor. Laminations are quite frequently punched from strip or plate stock of sheet metal and since the sheet metal has inherent grain because of the method of making the strip or plate stock, it is desirable to randomly orient the grain so as not to adversely affect the performance of characteristics of the alternating current motor. This precludes maintaining the stack of laminations in precise alignment continuously from the time of their being punched from the strip until the time when they are to be wound with the windings. Consequently, it is necessary to realign the holes in the periphery of the rotor, for example, in order to be able to insert the windings. Consequently, it is an object of the present invention to make a machine capable of aligning a plurality of holes around the periphery of laminations in a stack.

Another object of the invention is to provide a stack aligning machine capable of automatically aligning a plurality of laminations in a stack.

Another object of the invention is to provide a laminated stack aligning machine wherein a resilient wobble pin is caused to whip or oscillate so that it moves axially parallel to the stack and burrows through a series of holes in the periphery of the stack.

Another object of the invention is to provide an aligning machine wherein a first pin loosely aligns a stack of laminations and a second alignment pin precisely aligns this lamination stack.

Still another object of the invention is to provide an aligning machine wherein the stack is loosely aligned by an aligning pin, then precisely aligned by an alignment pin, and then resiliently held in alignment while the aligning and alignment pins are withdrawn.

Another object of the invention is to provide a slender or resilient wobble or aligning pin which is given a rapid series of sharp impulses and with a weight or inertia means acting on the pin so that the pin is caused to whip or transversely vibrate quite violently and hence to rapidly burrow its way downwardly through a series of holes in a stack of laminations.

Other objects and a fuller understanding of this invention may be had by referring to the following description and claims, taken in conjunction with the accompanying drawings, in which:

Figure 2:
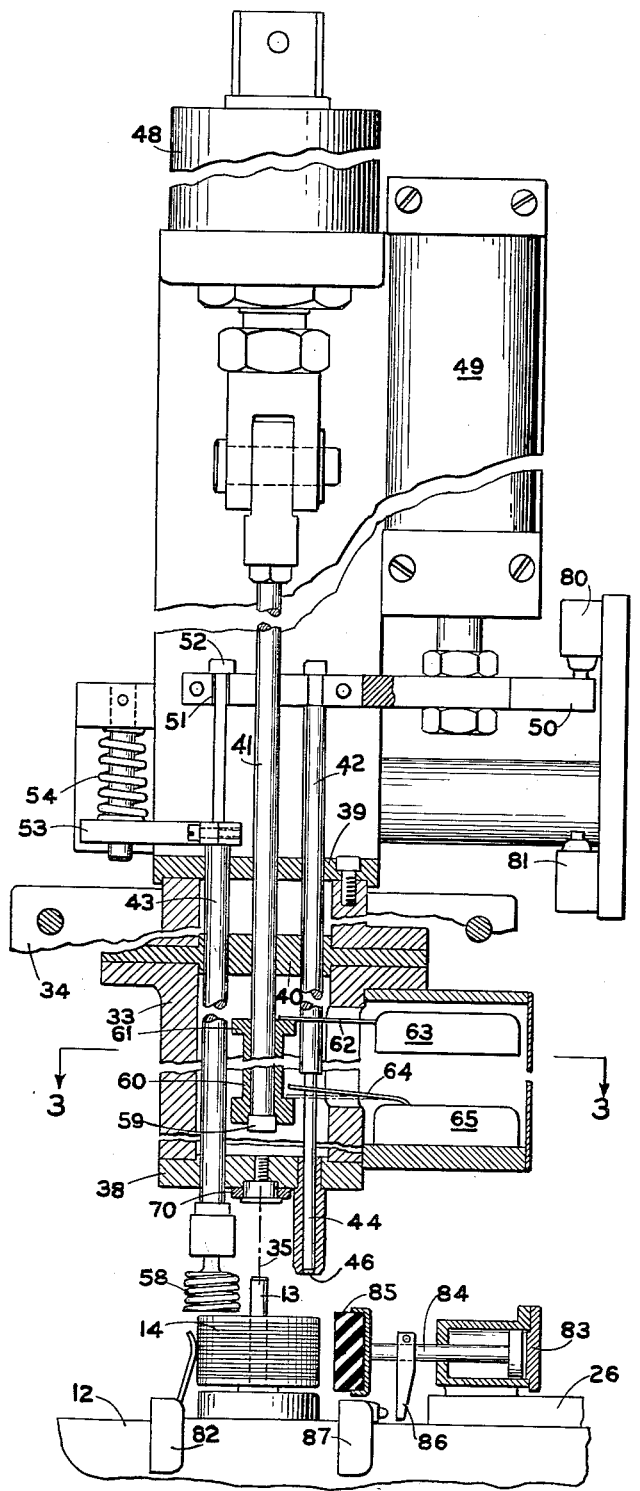
Figure 2 is an elevational sectional view of the line-up station.
Figure 6:
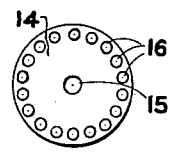
Figure 6 is a top view of the lamination stack.
Figure 1:
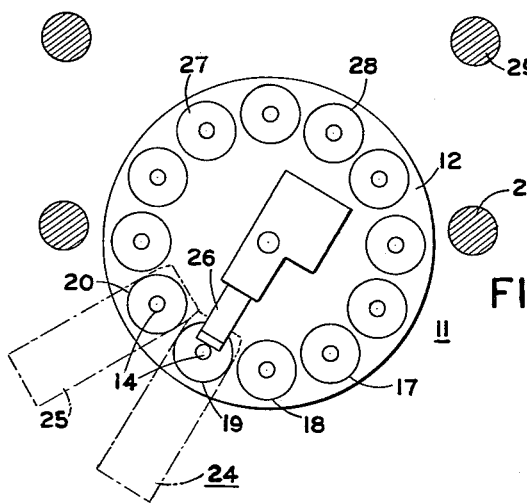
Figure 1 shows a diagrammatic plan view of an aligning machine utilizing the invention.
Figure 3:
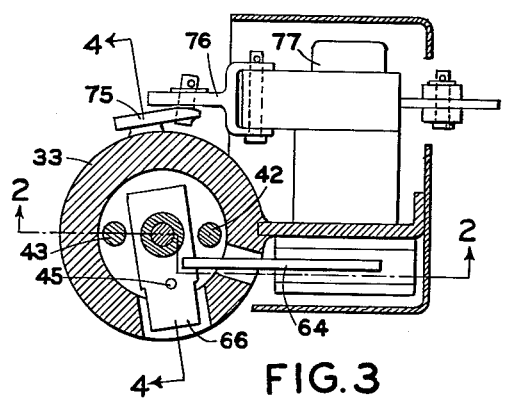
Figure 3 is a sectional view taken on the line 3—3 of Figure 2.
Figure 4:
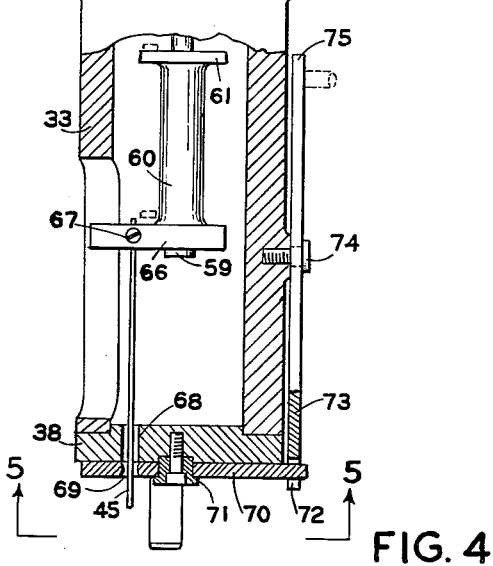
Figure 4 is an elevational sectional view taken on the line 4—4 of Figure 3.
Figure 5:
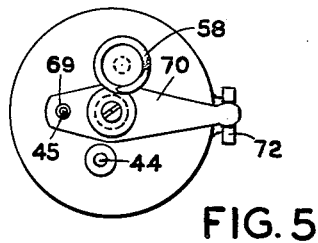
Figure 5 is a bottom view of the line-up station.

Figure 1 generally shows the entire aligning machine 11 which, for purpose of illustration but not limitation, has been shown as a machine for aligning laminations of sheet metal arranged in a stack and with each lamination having a plurality of holes around the periphery thereof. The aligning machine 11 includes generally an indexing table 12 having a plurality of spindles 13 vertically disposed on the table 12. Each of these spindles 13 is adapted to receive a lamination stack 14 at a central aperture 15 thereof, as shown in Figure 2. Each lamination stack 14 has a plurality of holes 16 around the periphery thereof, as shown in Figure 6. Figure 1 shows that the indexing table 12 has a stack loading or stack transfer position 17, a shuffler position 18, a line-up position 19, and a pinning position 20. The Figure 1 shows that the aligning machine 11 includes a line-up station 24 adapted to cooperate with a stack of laminations at the line-up position 19 of the indexing table 12. Also diagrammatically shown in Figure 1, the machine 11 includes a pinning station 25 adapted to cooperate with a lamination stack at the pinning station 20 of the indexing table 12. A stack clamp 26 is diagrammatically shown in Figure 1, and this stack clamp cooperates with any stack at the line-up position 19 and arcuately moves with each stack to the pinning position 20.

The line-up station 24 lines up the holes 16 in the periphery of the stack 14, the pinning station 25 places conductor pins in the aligned holes, and then the indexing table 12 indexes to press positions 27 and 28 within a press as shown by the columns 29 whereat the conductor pins are peened or headed so as to fasten the stack together, and in this case to construct a squirrel cage induction motor rotor. This is merely one example of a use for this aligning machine 11.

Figures 2, 3, 4, and 5 show in more detail the line-up station 24 which includes a vertical holder or stand 33 fixedly carried by a support 34 form the press columns 29. Figure 2 shows a part of the indexing table 12 with one of the vertical spindles 13 shown at the line-up position 19. A stack 14 is shown on the spindle 13 in this position and has an axis 35 which in this case is vertical. The vertical stand 33 has the same axis 35 and is positioned directly above the lamination stack 14.

The stand 33 has a bottom plate 38, a top plate 39 and an intermediate plate 40 with the plates 39 and 40 apertured to receive a vertical rod 41, an alignment pin 42 and a presser rod 43. The bottom plate 38 is apertured to receive the presser rod 43, an extension 44 of the alignment pin 42, and an aligning pin or wobble pin 45. The extension 44 of the alignment pin 42 has a bullet nose 46. A first air cylinder 48 is mounted at the top of the stand 33 and connects to the central rod 41 to vertically move same between an upper retract position shown in Figures 2 and 4 and a lower operating position. A second air cylinder 49 is also mounted on the vertical stand 33 and vertically moves a plate 50 between an upper retract position shown and a lower operating position. The alignment pin 42 is fixedly carried at the upper end thereof in the plate 50 to move directly in accordance therewith. The presser rod 43 extends loosely through an aperture 51 in the plate 50 and an upper head 52 of this presser rod 43 engages the upper surface of this plate 50. An arm 53 is fixed to the presser rod 43 and is engaged by a compression spring 54 acting against the vertical stand 33.

This compression spring 54 urges downwardly the presser rod 43 until the arm 53 is stopped by the top plate 39. In the retract position shown, the second cylinder 49 and the plate 50 lifts the presser rod, through the agency of head 52, so that the arm 53 is a distance above the top plate 39.

The presser rod 43 carries at the lower end thereof a spring presser foot 58 which, when lowered to the bottom whereat arm 53 engages top plate 39, the lower surface of this presser foot 58 will engage the upper surface of the stack 14.

The central rod 54 has a head 59 at the lower end thereof which carries a loosely mounted weight 60 on the lower end of this rod 41. An upper flange 61 is adapted to engage and actuate an arm 62 of a switch 63 when the first cylinder 48 is in the upper retracted position. When the cylinder 48 is in the downward operating position, the flange 61 engages and actuates an arm 64 of a switch 65. The weight 60 has a transverse extension 66 at the lower end thereof which fixedly carries, as by a set screw 67, the upper end of the wobble or aligning pin 45. The bottom plate has a large aperture 68 through which the wobble pin 45 passes and this pin also passes through a yoke aperture 69 in a lever 70 which is pivoted at 71 on the axis 35. The lever 70 engages another yoke 72 on a second lever 73 pivoted at 74 on the vertical stand 33. The upper end 75 of the lever 73 is connected by a link 76 to a vibratory motor 77 which may be a solenoid type motor operating at a low frequency, for example, two or three times per second.

The plate 50 actuates a switch 80 in the upper retract position and actuates a switch 81 in the lower operating position. Figure 2 diagrammatically shows a switch 82 mounted at the line-up station and actuated by a stack 14 at line-up position 19 of the indexing table 12.

The stack clamp 26 is diagrammatically shown in Figure 2 as being mounted on the indexing table 12. This stack clamp 26 includes a cylinder 83 moving a piston rod 84 which in turn carries a resilient rubber pad 85 disposed to engage the outer cylinder surface of the lamination stack 14. An arm 86 on the piston rod 84 actuates switch 87 when the pad 85 is in clamping engagement with the stack 14.

Operation

The aligning machine 11 may be utilized as part of a machine to assemble rotors of a squirrel cage induction motor, merely by way of example. These rotors are cylindrical and made of sheet steel laminations which, for example, may be .025 inch in thickness. Many subfractional horsepower alternating-current motors have rotors of the range of ¾" to 2" and are made in large volume which could readily utilize the present invention.

Figure 1 shows that the indexing table 12 has a stack loading position 17 and then the indexing table 12 may index to a line-up position 19. The Figure 6 shows a top view of a typical stack of laminations 14 which has a plurality of holes 16 equally spaced around the periphery thereof. In this case eighteen such holes have been shown although this is merely illustrative. The holes in the various laminations will be in any random misalignment especially because the position 18 on the indexing table 12 may be utilized as a shuffler position to shuffle the laminations so that any errors in stamping holes and variations in thickness of the lamination steel from one side to the other will be averaged out, to result in a better balanced rotor.

With the stack 14 at the line-up position 19, the line-up station 24, best shown in Figures 2–5, may be utilized to align a series of holes in this lamination stack 14. The switch 82 may sense the existence of a stack 14 at the line-up position 19 and this actuates control of the first cylinder 48. This cylinder moves downwardly from the upper retract position shown to an operating position whereat the head 49 will be near the bottom plate 38. The weight 60 thereon carries the aligning pin 45 downwardly until it engages the top of the lamination stack 14. This aligning pin is vertical and spaced from the axis 35 a distance equal to the radial distance of the holes 16.

As the weight 60 drops down, the switch 63 is actuated by flange 61 to start the vibratory motor 77. This is preferably a motor which is capable of giving rather violent transverse motions to the aligning pin 45, such as a solenoid type motor which is rapidly pulled in one direction, and not quite as rapidly returned by a built-in spring. Th vibration of this motor may be at any desired frequency necessary to give a rather violent wobbling action to the wobble pin 45. A frequency of 2 to 4 operations per second has been found quite satisfactory with a lamination stack of sheet steel of about .025 thickness and with each lamination about one or one and one-half inches in diameter. The height of the stack 14 may vary in accordance with the power output requirements of the motor with which it is used, and a stack height of about ¾" has been shown.

The vibratory action of the vibratory motor 77 is imparted through the levers 70 and 73 to the aligning pin 45 near its lower end. This aligning pin is long, slender and resilient and may be about ⅟₁₆ of an inch in diameter which is about half the diameter of the holes 16. The lower end of this aligning pin is preferably blunt rather than sharp so that the kicking or whipping action of this pin plus the downward force of the weight 60 causes the pin to burrow rapidly downwardly through the stack 14. This burrowing action takes place extremely rapidly, in considerable less time than one second, and is a combined result of the transverse vibratory movement and the weight 60. This weight 60 need not be large, in fact, 2 or 3 ounces has been found quite satisfactory for the laminations used, and this weight provides an axial force attempting to force the aligning pin axially through a series of holes 16. The fact that the lower end of the aligning pin 45 is blunt appears to work better than a sharp point since it does not dig into the surface of the individual laminations and instead will slide sideways on a particular lamination until it finds the nearest hole and then, of course, drops through this hole under action of the weight 60. The vibratory motor 77 may have only about ¼" movement and, due to the choice of lever arms, the yoke 69 has only about a ⅟₁₆" movement. The fact that the aligning pin 45 is long and slender, however, plus the fact that the upper end engages the weight 60, causes the aligning pin 45 to wobble or vibrate somewhat like a violin string wherein the amplitude of vibration may be considerably greater than the amplitude of the driving force. The weight 60 is a form of inertia means which tends to restrain transverse movement of the upper end of the aligning pin 45 and this accentuates the transverse vibratory movement of the lower or operating end of this aligning pin.

When the aligning pin 45 has burrowed its way completely through the lamination stack 14, the weight 60 will have dropped to its lowermost position and hence the flange 61 will actuate the switch 65. This provides control of the second cylinder 49 which starts downwardly from the upper retract position to its lower operating position as governed by switch 81 actuated by plate 50. As the plate 50 starts downwardly, both the presser rod 43 and the alignment pin 42 start down together. The downward movement of the presser rod 43 is caused by the compression spring 54 but this movement ceases as soon as arm 53 engages the top plate 39. But before this movement ceases, however, the presser foot 58 will have engaged the upper surface of the lamination stack 14 to resiliently hold this stack loosely aligned as determined by the aligning pin 45. The alignment pin 42 is fixedly attached to the plate 50 and hence is forced downwardly directly in accordance therewith. The alignment pin extension 44 has a diameter substantially the same as the diameter of the holes 16 and the bullet nose 46 permits entrance of this alignment pin 44 into the holes 16. The lower end extension 44 of this alignment pin will extend completely through the stack 14 to precisely align a series of holes therein and after this precise alignment, the plate 50 will engage switch 81. This switch stops the vibratory motor and also controls actuation of the stack clamp 26, and hence the piston rod 84 moves the resilient pad 85 inwardly to engage the cylindrical outer surface of the stack 14. When these two parts are in engagement, the arm 86 actuates switch 87 and this controls both cylinders 48 and 49 to cause upward retract movement thereof. The upward movement of the cylinder rod 41 lifts the weight 60 and the aligning pin 45 to the upper retracted position so that the pin 45 is no longer in engagement with the stack 14. The upward retract movement of the plate 50 pulls the alignment pin extension 44 completely out of the stack 14 before plate 50 engages head 52 to slightly lift the presser rod 43. This means that the presser foot 58 remains in engagement with the upper surface of the lamination stack 14 during the upward retract movement of both the aligning and alignment pins 45 and 42. This therefore helps assure that the stack 14 will not be jarred out of alignment by this withdrawal movement of these pins 45 and 42. At the very final end of the retract movement of the cylinder 45, the presser foot 58 is lifted from engagement with the upper surface of the stack 14. The final movement of plate 50 actuates switch 80 which controls indexing movement of the indexing table 12 to move it to the next station and to bring another misaligned stack into axial registration with the line-up station 24. The preceding cycle may thereupon again be repeated to align the new stack 14.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A stack aligning machine for aligning a stack of laminations having an axis and each lamination having holes equally spaced around the periphery, said machine comprising, an aligning pin disposed substantially axially parallel and spaced from the axis of said stack a distance equal to the radial distance of said holes from said axis, a relatively blunt end on said aligning pin adapted to engage a hole in said laminations, means acting on the opposite end of said pin restraining transverse movement, means establishing an axial force urging said pin toward said stack, and transverse vibrating means acting on said aligning pin near said blunt end during application of said axial force to cause it to burrow axially through one hole in each of said laminations to align all of said laminations.

2. A stack aligning machine for aligning a stack of laminations having an axis and each lamination having holes equally spaced around the periphery, said machine comprising, an aligning pin having an operating end and a diameter considerably smaller than said holes, support means holding said aligning pin substantially parallel but spaced from the axis of said stack a distance equal to the radial distance of said holes from said axis, means establishing an axial force urging said pin toward said stack, means acting on the opposite end of said pin restraining transverse movement, transverse vibrating means acting on said aligning pin near said operating end during application of said axial force to cause it to burrow axially through one hole in each of said laminations to roughly align each of said laminations, and means having a diameter substantially equal to the minimum width dimension of said holes to precisely align said lamination holes.

3. A stack aligning machine for aligning a stack of laminations with each lamination having holes equally spaced around the periphery, said machine comprising, a line-up station for a stack of laminations having an axis, an aligning pin disposed substantially axially parallel and spaced from the axis of said stack a distance equal to the radial distance of said holes from said axis, an operating end on said aligning pin adapted to engage a hole in said laminations, means acting on the opposite end of said pin restraining transverse movement, means establishing an axial force urging said pin toward said stack, transverse vibrating means acting on said aligning pin near said operating end to cause it to burrow axially through one hole in each of said laminations to roughly align all of said laminations, a bullet-nosed alignment pin with an operating end diameter substantially equal to the minimum width dimension of said holes, and means to force said alignment pin axially through a series of roughly aligned holes to precisely align said lamination holes.

4. A stack aligning machine for a plurality of laminations in a stack and having holes equally spaced around the periphery, said machine comprising, a line-up station, an aligning pin vertically disposed and spaced from the vertical axis of said stack a distance equal to the radial distance of said holes from said axis, means acting on the upper portion of said aligning pin restraining transverse movement thereof, means establishing a downward force on said pin, transverse vibrating means acting on a lower portion of said aligning pin to cause it to burrow downwardly through one hole in each of said laminations to roughly align all of said laminations, a bullet-nosed alignment pin with a lower end diameter substantially equal to the minimum width dimension of said holes, and means to vertically force said alignment pin downwardly through a series of roughly aligned holes to precisely align said lamination holes.

5. A stack aligning machine for aligning a stack of laminations having an axis, a plurality of holes equally spaced around the periphery of each lamination, a relatively long, slender and resilient aligning pin disposed substantially axially parallel and spaced from the axis of said stack a distance equal to the radial distance of said holes from said axis, a weight acting on said pin urging same toward said stack, means to impart a transverse whipping action to said aligning pin to cause it to burrow downwardly through one hole in each of said laminations, a bullet-nosed alignment pin with an operative end diameter substantially equal to the diameter of said holes, and means to force said alignment pin axially through a series of aligned holes to precisely align said lamination holes.

6. A stack aligning machine for aligning a stack of laminations having a central aperture receivable on a spindle, each lamination in said stack having a plurality of equally spaced holes around the periphery thereof, said stack of laminations having said holes in random misalignment, a relatively long, slender and resilient alignment pin having a diameter approximately half the diameter of said holes and having a length far in excess of the height of said stack of laminations, means establishing said aligning pin at a radial distance from the axis of said stack substantially equal to the radial distance of said holes from said axis, first means connected to establish axially advancing movement of said aligning pin toward said stack, means to impart a transverse whipping action to said aligning pin to cause it to burrow axially through one hole in each of said laminations to roughly align all of said laminations, a rounded alignment pin having a diameter substantially equal to the diameter of said holes and spaced from said axis by the radial distance of said holes therefrom, and second means to establish axially advancing movement of said alignment pin through a roughly aligned series of holes to precisely align same.

7. A stack aligning machine for aligning a vertical stack of laminations, each lamination in said stack having a plurality of equally spaced holes around the periphery thereof, said stack of laminations having said holes in random misalignment, a relatively long, slender and resilient aligning pin having a diameter approximately half the diameter of said holes and having a length far in excess of the vertical height of said stack of laminations, a weight acting on said aligning pin, means establishing said aligning pin at a radial distance from the axis of said stack substantially equal to the radial distance of said holes from said axis, first power means connected to permit downward movement of said pin from a retract position to an operating position, means to impart a transverse whipping action to said aligning pin to cause it to burrow downwardly through one hole in each of said laminations to roughly align all of said laminations, a bullet-nosed alignment pin having a diameter substantially equal to the diameter of said holes and vertically spaced from said axis by the radial distance of said holes therefrom, second power means to move said alignment pin downwardly from a retract position to an operating position to force said alignment pin through a roughly aligned series of holes to precisely align same, a resilient pad, means moving said resilient pad laterally into engagement with the circumference of said stack of laminations to hold said stack in fixed alignment, and means to cause retract movement of both said power means to retract said aligning and alignment pins.

8. A stack aligning machine having an indexing table with a plurality of vertical spindles each for receiving the central aperture of a vertical stack of circular laminations, each lamination in said stack having a plurality of equally spaced holes around the periphery thereof, said stack of laminations having said holes in random misalignment, a line-up station for said indexing table, a relatively long, slender and resilient aligning pin having a diameter approximately half the diameter of said holes and having a length far in excess of the vertical height of said stack of laminations, a vertical guide, a weight acting on said aligning pin and loosely carried on said guide, means establishing said aligning pin at a radial distance from said central spindle substantially equal to the radial distance of said holes from said axis, first power means connected to permit downward movement of said pin from a retract position to an operating position, means to impart a transverse whipping action to said aligning pin to cause it to burrow downwardly through one hole in each of said laminations to roughly align all of said laminations, a bullet-nosed alignment pin having a diameter substantially equal to the diameter of said holes and vertically spaced from said axis by the radial distance of said holes therefrom, a presser rod having a spring presser foot on the lower end thereof, second power means to move said alignment pin downwardly from a retract position to an operating position to force said alignment pin through a roughly aligned series of holes to precisely align same, means acting with said second power means to urge said presser foot downwardly to engage the upper surface of said lamination stack, a resilient pad, means on said indexing table moving said resilient pad laterally into engagement with the circumference of said stack of laminations to hold said stack in fixed alignment, and means to cause retract movement of both said power means to retract said aligning and alignment pins and said presser foot during indexing of said aligned stack from said line-up station to the next station of said table.

9. A stack aligning machine having an indexing table with a plurality of vertical spindles each for receiving the central aperture of a vertical stack of circular laminations, each lamination in said stack having a plurality of equally spaced holes around the periphery thereof, said stack of laminations having said holes in random misalignment, a line-up station for said indexing table, a central rod axially aligned with said stack at said line-up station, a vertical aligning pin having a diameter approximately half the diameter of said holes and having a length far in excess of the vertical height of said stack of laminations, a weight acting on the upper portion of said aligning pin and loosely carried on said central rod, a yoke surrounding said aligning pin at a point near the bottom of said aligning pin, means establishing said aligning pin at a radial distance from said central spindle substantially equal to the radial distance of said holes from said axis, first power means connected to move said central rod downwardly from a retract position to an operating position, means to oscillate said yoke to give a lateral reciprocatory motion to said aligning pin to cause it to burrow downwardly through one hole in each of said laminations to roughly align all of said laminations, a bullet-nosed alignment pin having a diameter substantially equal to the diameter of said holes and vertically spaced from said axis by the radial distance of said holes therefrom, a presser rod having a spring presser foot on the lower end thereof, a spring acting on said presser rod, second power means to move said alignment pin downwardly from a retract position to an operating position to force said alignment pin through a roughly aligned series of holes to precisely align same, means acting with said second power means to render said spring effective to urge said presser foot downwardly to engage the upper surface of said lamination stack, a resilient pad, means on said indexing table moving said resilient pad laterally into engagement with the circumference of said stack of laminations to hold said stack in fixed alignment, and means to cause retract movement of both said power means to retract said aligning and alignment pins and said presser foot during indexing of said aligned stack from said line-up station to the next station of said table.

10. A rotor pinning machine having an indexing table with a plurality of vertical spindles, a vertical stack of rotor laminations having a central shaft aperture receivable on each of said spindles, each lamination in said stack having a plurality of equally spaced holes around the periphery thereof, said stack of laminations having said holes in random misalignment, a line-up station for said indexing table, a central rod axially aligned with said stack at said line-up station, a first air cylinder connected to move said central rod downwardly to an operating position and upwardly to a retract position, a vertical aligning pin having a diameter approximately half the diameter of said holes and having a length far in excess of the vertical height of said stack of laminations, a weight acting on the upper end of said aligning pin and loosely carried on said central rod, a pivoted horizontal lever having a yoke surrounding said aligning pin at a point close to the bottom of said aligning pin, means establishing said aligning pin at a radial distance from said central spindle substantially equal to the radial distance of said holes from said axis, means initiating movement of said air cylinder downwardly to the operating position to cause said aligning pin to drop onto the upper surface of said stack of laminations, means to oscillate said lever to give a lateral reciprocatory motion to said aligning pin to cause it to burrow downwardly through one hole in each of said laminations to roughly align all of said laminations, a second air cylinder at said vertical stand having a downward operating and an upward retract position, a plate directly movable with said second cylinder, a bullet-nosed alignment pin having a lower end diameter substantially equal to the diameter of said holes and fixedly vertically carried in said plate spaced from said axis by the radial distance of said holes therefrom, a presser rod having a spring presser foot on the lower end thereof, said presser rod spring urged downwardly to engage the upper surface of any lamination stack, a shoulder on said presser rod, an aperture in said plate, said presser rod extending loosely through plate aperture with said shoulder engaging the upper surface of said plate with said second cylinder in said retract position to retract said alignment pin and said presser foot from contact with any said stack at said line-up station, means effecting movement of said second cylinder to said operating position to force said alignment pin downwardly through a roughly aligned series of holes in any said stack to precisely align said lamination holes and to have said presser foot resiliently engage the top of said stack, a resilient rubber pad, means on said indexing table moving said resilient rubber pad laterally into engagement with the circumference of said stack of laminations to hold said stack in fixed alignment, and means to cause retract movement of both said cylinders to retract said aligning and alignment pins and said presser foot.

11. In a rotor pinning machine having an indexing table with a plurality of vertical spindles each adapted to receive a stack of rotor laminations, each lamination in said stack having a plurality of equally spaced holes around the periphery thereof, said stack of laminations having said holes in random misalignment, a line-up station for said indexing table, a vertical stand at said line-up station, an air cylinder to move a central rod at said vertical stand downwardly to an operating position and upwardly to a retract position, a vertical aligning pin having a diameter approximately half the diameter of said holes and having a length far in excess of the vertical height of said stack of laminations, a weight on the upper end of said aligning pin, a pivoted horizontal lever having a yoke surrounding said aligning pin at a point close to the bottom of said aligning pin, means to oscillate said lever to give a lateral reciprocatory motion to said aligning pin, means establishing said aligning pin at a radial distance from said central spindle substantially equal to the radial distance of said holes from the center of said rotor laminations, whereby when said air cylinder moves said central rod downwardly to the opposite position said aligning pin drops onto the surface of the upper end of said stack of laminations and said lateral reciprocatory movement of said aligning pin causes it to burrow downwardly through one hole in each of said laminations to roughly align all of said laminations, a bullet-nosed alignment pin having a diameter substantially equal to the diameter of said holes, means moving said alignment pin downwardly through a roughly aligned series of holes in said stack of rotor laminations to precisely align said laminations, a spring presser foot carried in said vertical stand, and means to move said foot downwardly to engage the surface of the upper lamination to hold said stack in alignment, and means to actuate said air cylinder to the retract position to effect upward withdrawal movement of said aligning and alignment pins.

12. A rotor pinning machine having an indexing table with a plurality of vertical spindles, a vertical stack of rotor laminations having a central shaft aperture receivable on each of said spindles, each lamination in said stack having eighteen equally spaced holes around the periphery thereof, said stack of laminations having said eighteen holes in random misalignment, a plurality of stations including a line-up station for said indexing table, a vertical stand at said line-up station, a central rod within said vertical stand axially aligned with said stack, a first air cylinder connected to move said central rod within said vertical stand downwardly to an operating position and upwardly to a retract position, a vertical aligning pin having a diameter approximately half the diameter of said holes and having a length far in excess of the vertical height of said stack of laminations, a weight acting on the upper end of said aligning pin and loosely carried on said central rod, a pivoted horizontal lever having a yoke surrounding said aligning pin at a point close to the bottom of said aligning pin, means to oscillate said lever to give a lateral reciprocatory motion to said aligning pin, means establishing said aligning pin at a radial distance from said central spindle substantially equal to the radial distance of said holes from said axis, means effecting movement of said air cylinder downwardly to the operating position to cause said aligning pin to drop onto the upper surface of said stack of laminations, means to initiate said lateral reciprocatory movement of said aligning pin to cause it to burrow downwardly through one hole in each of said laminations to roughly align all of said laminations, a second air cylinder at said vertical stand having a downward operating and an upward retract position, a plate directly movable with said second cylinder, a first aperture in said plate loosely surrounding said central rod, a bullet-nosed alignment pin having a lower end diameter substantially equal to the diameter of said holes and fixedly vertically carried in said plate spaced from axis by the radial distance of said holes therefrom, a presser rod having a spring presser foot on the lower end thereof, said presser rod carried in said vertical stand and spring urged downwardly to engage the upper surface of any lamination stack to hold said stack in alignment during upward withdrawal movement of said aligning and alignment pins, a shoulder on said presser rod, a second aperture in said plate, said presser rod extending loosely through second plate aperture with said shoulder engaging the upper surface of said plate with said second cylinder in said retract position to retract said alignment pin and said presser foot from contact with any said stack at said line-up station, means effecting movement of said second cylinder to said operating position to force said alignment pin downwardly through a roughly aligned series of holes in any said stack to precisely align said lamination holes and to have said presser foot resiliently engage the top of said stack, a resilient rubber pad, means on said indexing table moving said resilient rubber pad laterally into engagement with the circumference of said stack of laminations to hold said stack in fixed alignment, means to cause retract movement of both said cylinders to retract said aligning and alignment pins and said presser foot, and means to index said table to move said aligned stack from said line-up station to the next station of said table and to index to said line-up station another misaligned stack.

13. A stack aligning machine for aligning a stack of objects having an axis and each object having a series of holes equally spaced from said axis, said machine comprising, an aligning pin disposed substantially axially parallel and spaced from the axis of said stack a distance equal to the radial distance of said holes from said axis, a relatively blunt end on said aligning pin adapted to engage a hole in said objects, means acting on the opposite end of said pin permitting only limited and restrained transverse movement, means establishing an axial force urging said pin toward said stack, and transverse vibrating means acting on said aligning pin near said blunt end during application of said axial force to cause it to burrow axially through one hole in each of said objects.

14. A stack aligning machine for aligning a stack of objects having an axis and each object having a series of holes equidistant from said axis, said machine comprising, an aligning pin having a diameter smaller than said holes, support means holding said aligning pin substantially parallel but spaced from the axis of said stack a distance equal to the radial distance of said holes from said axis, means establishing an axial force urging said pin toward said stack, means acting on the opposite end of said pin permitting limited but restrained transverse movement, transverse vibrating means acting on said aligning pin near said operating end during application of said axial force to cause it to burrow axially through one hole in each of said objects to roughly align each of said objects, and means having a diameter substantially equal to the minimum width dimension of said holes to precisely align said holes.

References Cited in the file of this patent

UNITED STATES PATENTS

| | | |
|---|---|---|
| 2,004,464 | Clarkson | June 11, 1935 |
| 2,783,897 | Farquharson | Mar. 5, 1957 |